United States Patent
Dickinson

(10) Patent No.: US 11,440,486 B2
(45) Date of Patent: Sep. 13, 2022

(54) FASTENER CLIP WITH STABILIZING SHOULDER TABS

(71) Applicant: Termax LLC, Lake Zurich, IL (US)

(72) Inventor: Daniel James Dickinson, Lincolnshire, IL (US)

(73) Assignee: TERMAX LLC, Lake Zurich, IL (US)

( * ) Notice: Subject to any disclaimer, the term of this patent is extended or adjusted under 35 U.S.C. 154(b) by 206 days.

(21) Appl. No.: 16/739,111

(22) Filed: Jan. 9, 2020

(65) Prior Publication Data

US 2020/0164816 A1 May 28, 2020

Related U.S. Application Data

(63) Continuation-in-part of application No. 14/147,522, filed on Jan. 4, 2014, and a continuation-in-part of application No. 13/476,957, filed on May 21, 2012, now abandoned.

(60) Provisional application No. 62/804,321, filed on Feb. 12, 2019.

(51) Int. Cl.
*B60R 13/02* (2006.01)
*F16B 21/07* (2006.01)
*F16B 5/06* (2006.01)

(52) U.S. Cl.
CPC ........ *B60R 13/0206* (2013.01); *F16B 5/0657* (2013.01); *F16B 5/065* (2013.01); *F16B 21/075* (2013.01)

(58) Field of Classification Search
CPC ... F16B 5/0657; F16B 21/075; B60R 13/0206
See application file for complete search history.

(56) References Cited

U.S. PATENT DOCUMENTS

| | | | | |
|---|---|---|---|---|
| 4,043,579 A | * | 8/1977 | Meyer | B60R 19/44 293/143 |
| 4,402,118 A | * | 9/1983 | Benedetti | F16B 5/065 24/289 |
| 5,533,237 A | * | 7/1996 | Higgins | F16B 5/065 24/289 |
| 5,774,949 A | * | 7/1998 | Cornell | F16B 5/123 24/289 |
| 5,966,782 A | * | 10/1999 | Ishihara | F16B 5/0614 24/289 |
| 6,141,837 A | * | 11/2000 | Wisniewski | F16B 5/0614 24/289 |

(Continued)

*Primary Examiner* — Flemming Saether

(57) ABSTRACT

A system and method including a fastener clip. The fastener clip is configured to attach over a blade on a panel, and the fastener clip is configured to be removably coupled to a slot in a chassis. The fastener clip includes at least a pair of legs extending from a top portion of the fastener clip, at least a pair of feet attached to the pair of legs adjacent the top portion, at least a pair of wings originating from the top portion, at least a pair of barbs extending from the pair of feet, at least a pair of stabilizing shoulder tabs originating from the top portion. The pair of wings is configured to facilitate the removable engagement of the fastener clip to the slot in the chassis. The barbs are configured to dig into and secure the fastener clip to the blade. The pair of shoulder tabs is configured to guide the fastener clip over the blade based at least upon the fastener clip being inserted over the blade.

12 Claims, 9 Drawing Sheets

(56) References Cited

U.S. PATENT DOCUMENTS

| | | | | |
|---|---|---|---|---|
| 6,928,705 | B2* | 8/2005 | Osterland | B60R 13/0206 |
| | | | | 24/289 |
| 9,303,665 | B2* | 4/2016 | Steltz | F16B 5/0657 |
| 10,677,277 | B2* | 6/2020 | Bidlake | F16B 21/075 |
| 2019/0366944 | A1* | 12/2019 | Liu | F16B 21/075 |

\* cited by examiner

US 11,440,486 B2

FASTENER CLIP WITH STABILIZING SHOULDER TABS

A. BACKGROUND

The invention relates generally to devices for fastening objects, and more particularly to a fastener clip assembly for insertion into an engagement structure, such as a vehicle chassis, a hollow substrate, a wall, a plate, or any suitable surface.

A number of devices and fasteners are currently available for fastening panels, such as body panels and automobile interior trim piece panels, to the chassis of a vehicle. As used herein, a body panel refers to, for example, any interior or exterior body panel on a vehicle, a plastic interior trim piece, door panel, headliner or any interior trim piece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These conventional fastener devices provide approximately relatively equal levels of insertion and extraction force. These body panels often attach to the chassis of an automobile with a relatively high level of insertion force while providing a relatively low level of extraction force.

Fastener clips, such as two-piece fasteners (multi-piece), are known for attaching body panels to an automobile chassis. Two-piece fasteners are used so that if the panels are removed after original installation, such as to service the components in the door, they may be pulled apart so that one portion remains attached to the sheet metal while the other remains attached to the trim panel. The two pieces may also be reattached after separation. However, two-piece fasteners require manufacturing of multiple pieces and labor-intensive assembly of the two pieces and thus are relatively expensive.

One-piece fasteners are typically less expensive than two or multi piece fasteners. One-piece fasteners have a base to attach to a body panel and a post attached to the base and wings attached at least to the top of the post at a tip of the fastener for fastening to a frame slot. However, if the frame slot and the fastener are misaligned then the forces on the wings are unequal since the wing closest to the slot edge will experience higher wing compression while the other wing will have insufficient springing force to engage the slot. As the clip is forced into the slot, such high forces on one wing may cause the wing to break off thus rendering the fastener incapable of fastening the body panel to the frame. Worse, the broken, damaged or weakened wing can cause detachment of the body panel or contribute to rattles.

The wings of conventional fasteners have a sharp, unsmooth groove to engage the edge of the frame slot. When the clip is removed however, the sharp edges of the frame slot cut into the softer plastic and cut the groove. During manufacture, the slots are typically formed in the frame of the vehicle, such as in an inner roof or door sheet metal structure, by punching the sheet metal. As the punch enters the sheet metal, the outer part of the sheet metal is pushed toward the inside and a metal puncture or ridge is formed on the inside of the sheet metal. The resulting slot edge on the outer part of the slot is relatively smooth; however, the inner part of the slot edge is sharp and rough. Upon removal of the fastener clip, the sharp edges of the frame cut off the groove so that the clip may not be reinserted and reusable.

If the slot is off-center or if the sheet metal varies in thickness or if tolerances in production of the slot in the vehicle chassis or in the trim-piece exist, for example, then engagement of one portion of the hole in the chassis with one of the wings may not provide suitable frictional engagement. Twisting of the body panel will be likely more prevalent because less than all contact points are actually made with the slot of the vehicle chassis. As a result, conventional single piece fasteners do not self-align themselves when the fastener and the body panel are misaligned and are prone to wing breakage such that the fastener cannot be re-attached.

Conventional fasteners typically do not adequately secure the panel to the vehicle chassis having variations in slot size and location or sheet metal with different curvature or thicknesses throughout. Conventional single piece fasteners do not self-align themselves when the fastener and the body panel are misaligned and are prone to wing breakage such that the fastener cannot be re-attached. Also, conventional fasteners are not suitable when subjected to a variety of environmental conditions, such as in the presence of vibration at various levels of amplitude and frequency. For example, conventional fasteners of this type typically do not prevent or minimize the amount of buzzing, rattling or any other type of noise that may cause attention to the occupants of the vehicle or otherwise weaken the attachment. Conventional fasteners do not adequately accommodate various levels of production tolerances, such as various dimensions amongst, for example, the body panels as well as the vehicle chassis. Thus, conventional fastener devices typically do not self-align nor adequately fasten to a range of sheet metal thicknesses and do not minimize or eliminate buzzing and rattling and do not sufficiently accommodate variations in production tolerances. As a result, wear, squeaks, rattles, buzzing, corrosion and loss of elasticity and loss of sealing may result, especially after years of vehicle operation and exposure to vibration, heat, humidity, and other environmental conditions.

B. BRIEF DESCRIPTION OF THE DRAWINGS

Other objects and advantages of the invention may become apparent upon reading the detailed description and upon reference to the accompanying drawings.

Figure 1:
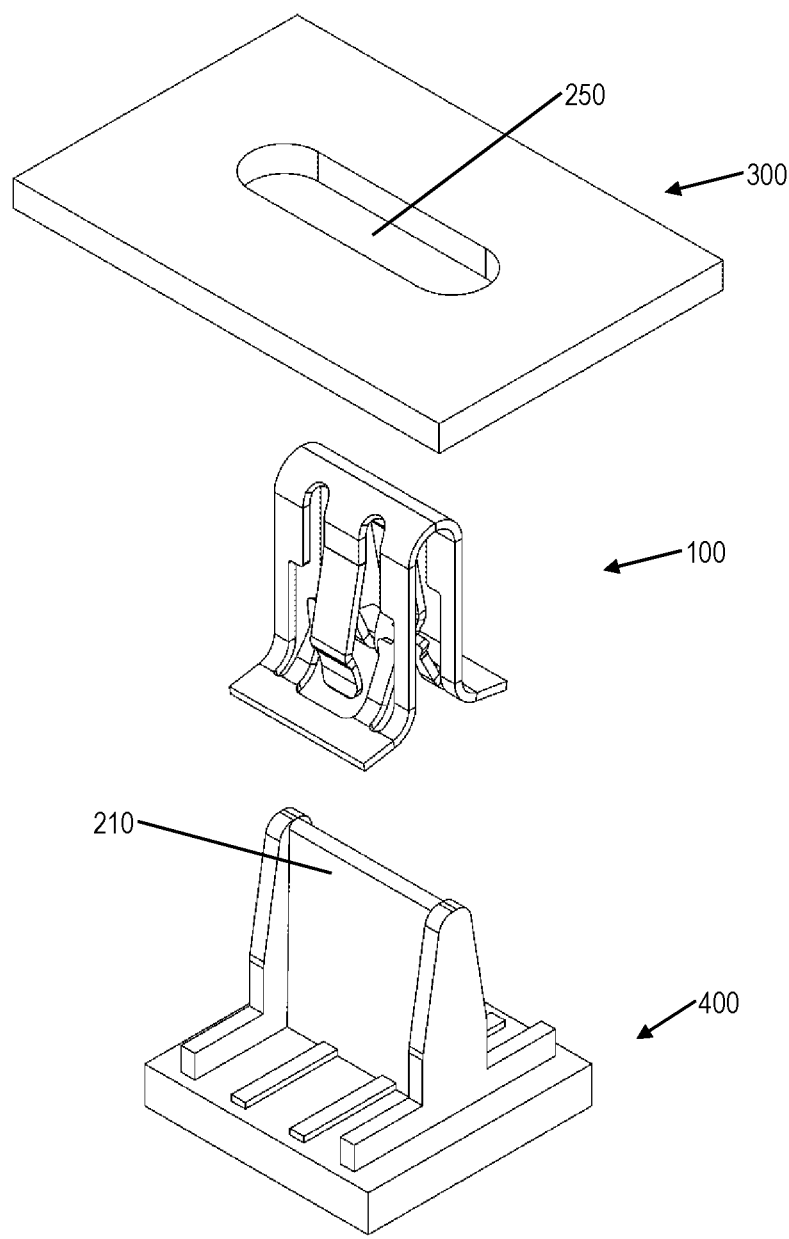
FIG. 1 is a perspective view of a fastener clip, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

C. DETAILED DESCRIPTION

FIG. 1 is a perspective view of a fastener clip, in accordance with some embodiments.

In some embodiments, fastener clip 100 is configured to fasten together top surface 300 and bottom surface 400. Blade 210, which extends from and is coupled to surface 400, is configured to receive and be coupled to fastener clip 100. In some embodiments, blade 210 may be molded onto surface 400. In other embodiments, blade 210 may be attached to surface 400 using various other means.

In some embodiments, fastener clip 100 may also be configured to be inserted through slot 250 of top surface 300 and to secure itself to the top surface 300. As such, in some embodiments, the fastener clip assembly is configured to fasten together top surface 300 and bottom surface 400.

In some embodiments, surface 400 may be part of a body panel and surface 300 may be part of the chassis of an automobile frame. Accordingly, the fastener clip assembly may be configured to fasten together a panel to the frame of an automobile.

Figure 2:
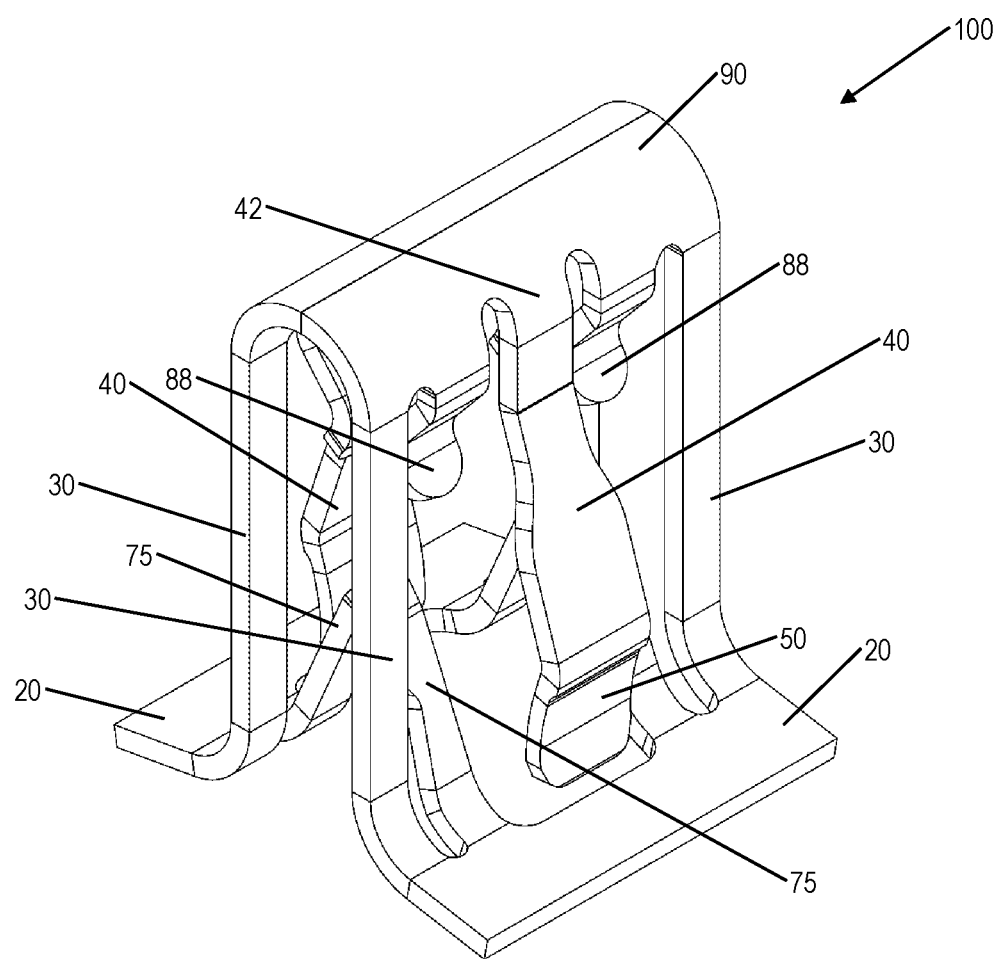
FIG. 2 is another perspective view of a fastener clip, in accordance with some embodiments.

FIG. 2 is another perspective view of a fastener clip, in accordance with some embodiments.

Figure 3:
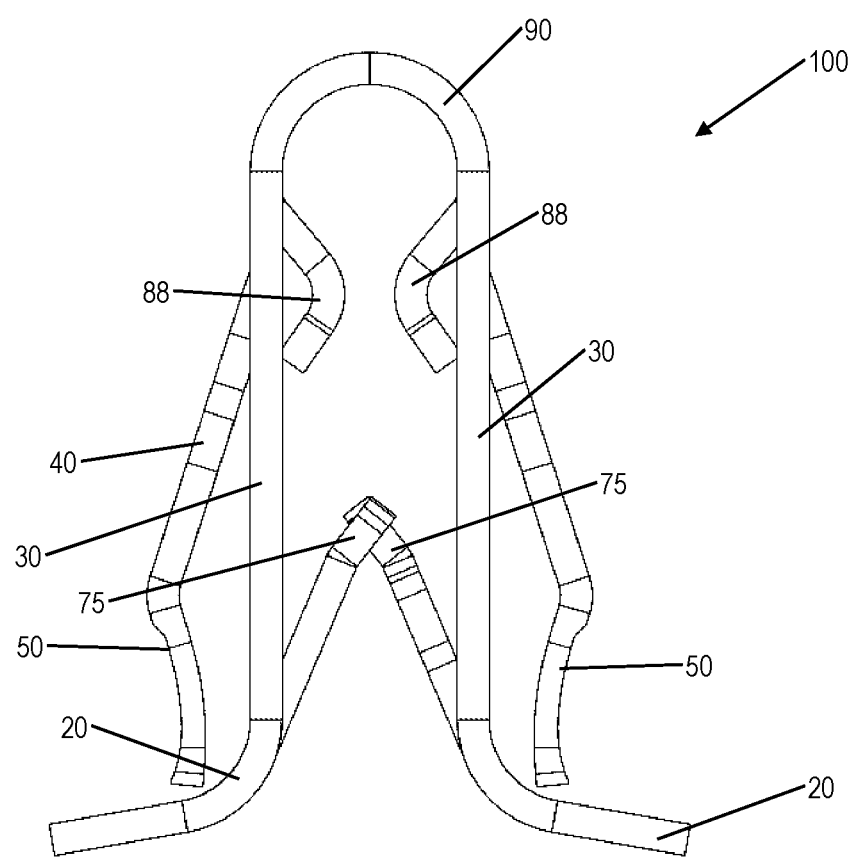
FIG. 3 is a side view of a fastener clip, in accordance with some embodiments.

FIG. 3 is a side view of a fastener clip, in accordance with some embodiments.

Figure 4:
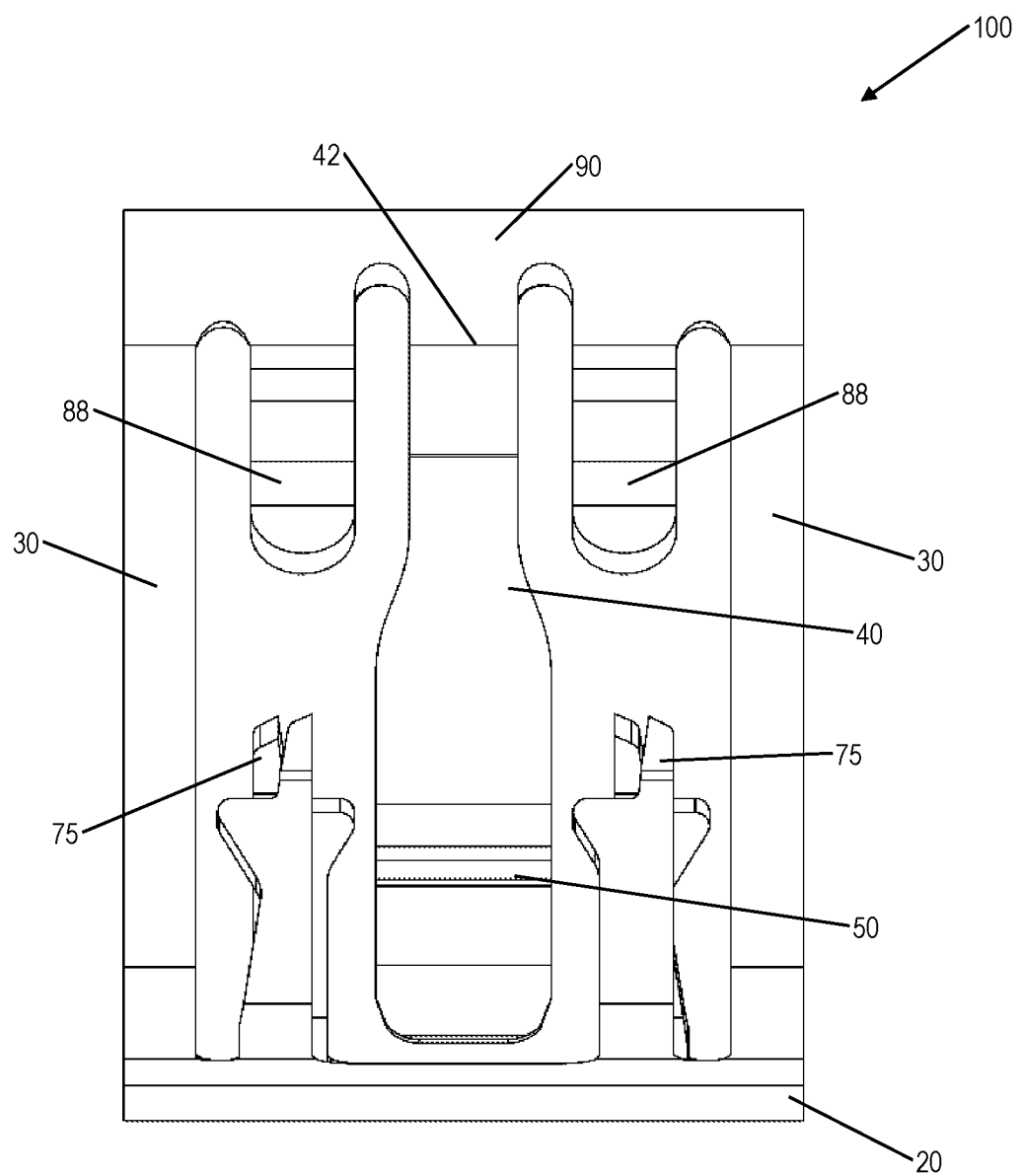
FIG. 4 is another side view of a fastener clip, in accordance with some embodiments.

FIG. 4 is another side view of a fastener clip, in accordance with some embodiments.

Fastener clip 100 includes first and second feet 20 and a first and second pair of laterally offset legs 30 extending respectively from first and second feet 20. In some embodiments, feet 20 are configured to provide a stopping point for fastener clip 100 when fastener clip 100 is being inserted into a slot.

In some embodiments, first and second pairs of laterally offset legs 30 are connected at the top of fastener clip 100 by top portion 90.

In some embodiments, top portion 90 may be configured to guide fastener clip 100 into a slot based at least upon having a curved surface. For example, top portion 90 may be sloped downward toward the two sides of fastener clip 100 such that fastener clip may be more easily inserted into a corresponding slot in one of the surfaces that is to be fastened.

In some embodiments, two laterally offset wings 40 extend downward from opposite sides of top portion 90. Wings 40 have an engagement region 50 that's configured to engage a slot and couple fastener clip 40 to the slot.

Although reference number 30 refers to both pairs of legs and reference number 40 refers to wings 40 on both pairs of legs 30, it is understood that the at least one first wing 40 corresponds to the first pair of legs 30 and the at least one second wing 40 corresponds to the second pair of legs 30.

Although the fastener clip 100 is shown with four legs 30 and two wings 40, any suitable number of legs 30 and wings 40 may be used. For example, two legs 30 and two wings 40 may be used, two legs 30 and four wings 40 may be used, three legs 30, four legs 30, etc. may be used. According to one embodiment, the legs 30 may have any suitable shape, such as for example, the legs are tapered, straight, curved, or any suitable shape.

In some embodiments, the wings 40 have a size, such as a width, length, thickness and a pivot point 42 to provide very high extraction force levels while the insertion force level is relatively very low. For example, the pivot point 42 may be weakened by scoring, stamping, bending or cutting, or any suitable means on wing 40 to ensure that the wings 40 spring inward as required so that the insertion force is low relative to the extraction force. Since the wings 40 are in compression during extraction, the weakened pivot point 42 does not significantly weaken the extraction force yet the insertion force is reduced. Additionally, the width of the wing 40 may be increased to further increase the strength of the wing and thus increase the extraction force, as well as increase the size of the engagement region. Alternatively, the width of the wing may be decreased, or the wings may have different widths and engagement regions 50 to achieve any desired insertion force, extraction force or ratio.

In some embodiments, fastener clip 100 may also comprise barbs 75 extending from feet 20. In some embodiments, fastener clip 100 may comprise. In some embodiments, barbs 75 may be configured to secure fastener clip 100 on blade 210. In some embodiments, barbs 75 are bent towards the inside of the fastener clip. By inserting the fastener clip over the blade, the barbs bend backwards and "dig" into the blade to prevent the fastener clip from being removed from the blade.

In some embodiments, stabilizing shoulder pads 88 are configured to guide fastener clip 100 over a blade, to which the clip is to attach, as the fastener clip is being inserted over the blade. As such, stabilizing shoulder pads 88 are configured to prevent excessive turning or excessive movement of the clip, for example, as the clip is being inserted over the blade. Excessive turning or otherwise excessive and unnecessary movement may prevent the clip from being inserted, and in addition, may damage the clip, the blade, or both.

Stabilizing shoulder tabs 88 may also be configured to provide additional stability between the blade and fastener clip 100 after installation. For example, by pressing against the top of the blade, stabilizing shoulder tabs 88 are configured to prevent excessive relative side-to-side motion between the clip and the blade. And in situations where fastener clip 88 may move side-to-side to the blade, causing a temporary bending of shoulder stabilizing tabs 88, the stabilizing tabs 88 are configured to bend back, restoring the original relative position of the clip and the blade.

Figure 5:
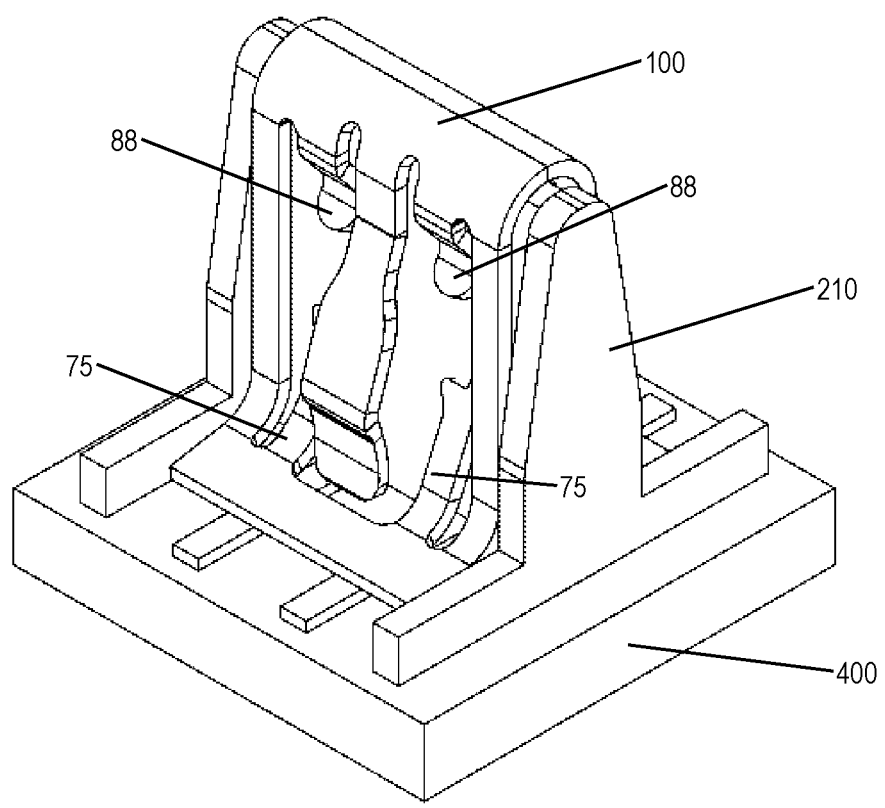
FIG. 5 is a perspective view of a fastener clip attached to a blade, in accordance with some embodiments.

FIG. 5 is a perspective view of a fastener clip attached to a blade, in accordance with some embodiments.

Figure 6:
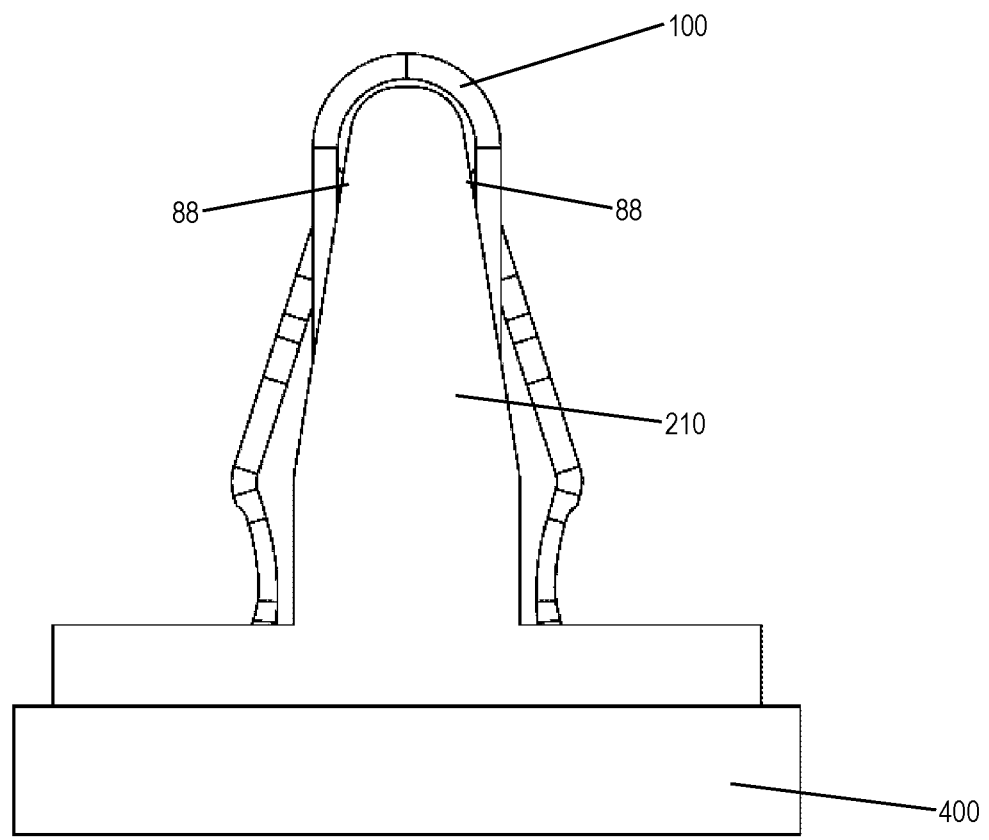
FIG. 6 is a side view of a fastener clip attached to a blade, in accordance with some embodiments.

FIG. 6 is a side view of a fastener clip attached to a blade, in accordance with some embodiments.

Figure 7:
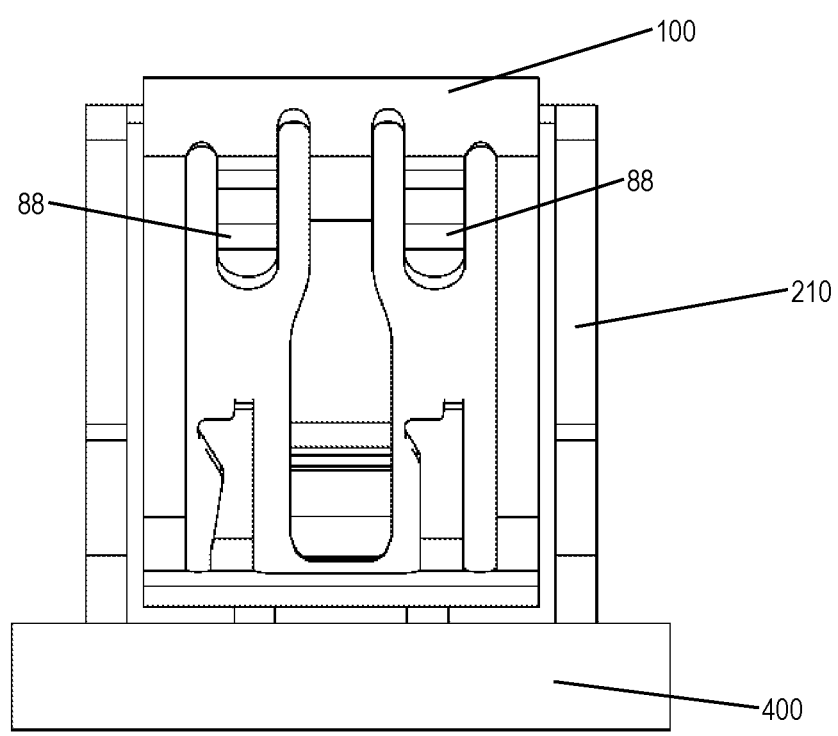
FIG. 7 is another side view of a fastener clip attached to a blade, in accordance with some embodiments.

FIG. 7 is another side view of a fastener clip attached to a blade, in accordance with some embodiments.

Fastener clip 100 is configured to fit over and attach to blade 210. Blade 210 may be either attached to or be part of surface 400. For example, blade 210 may be molded as part of surface 400 (which, in some embodiments, may be an automobile panel). In some embodiments, stabilizing shoulder pads 88 are configured to guide blade 210 into fastener clip 100 as the fastener clip is inserted over the blade. In addition, stabilizing shoulder tabs 88 are configured to provide additional stability between blade 210 and fastener clip 100 after installation. For example, by pressing against blade 210, stabilizing shoulder tabs 88 are configured to prevent excessive relative motion between the clip and the blade. And in situations where fastener clip 88 may move relative to blade 210, causing a slide bending of shoulder stabilizing tabs 88, the tabs are configured to bend back restoring the relative position of the clip and the blade to its original configuration.

In some embodiments, barbs 75 (four, in some embodiments) are configured to bend back as the clip slides onto the blade and "dig" into the blade to prevent removal of clip 100 from blade 210.

Figure 8:
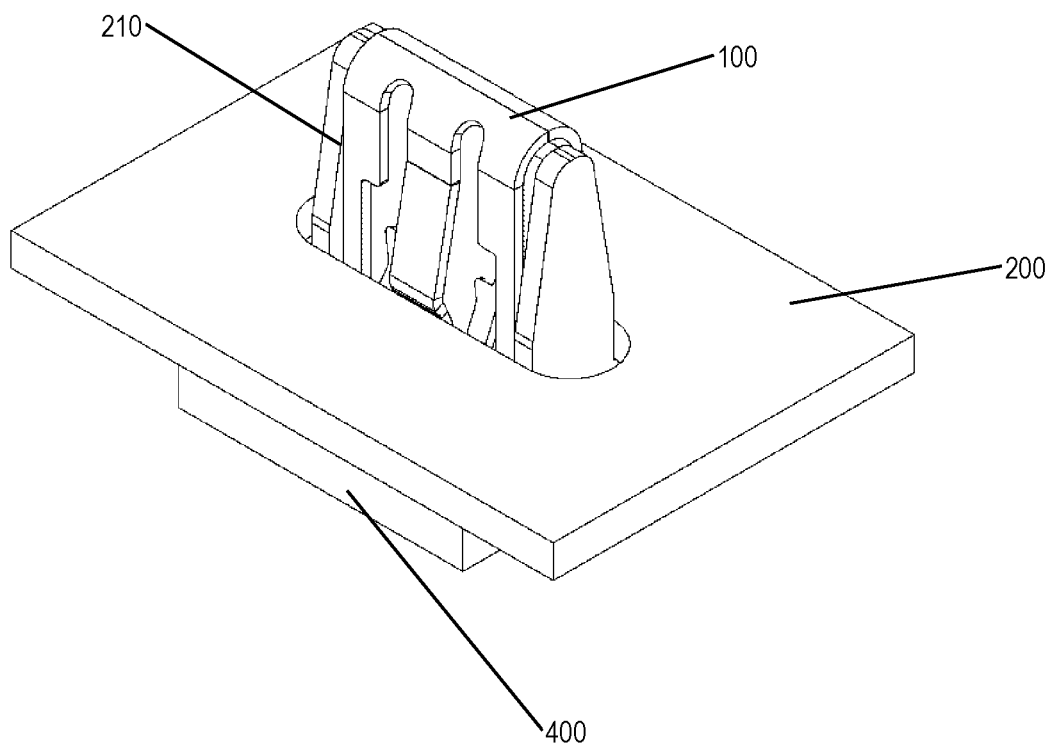
FIG. 8 is an assembled view of a fastener clip assembly, in accordance with some embodiments.

FIG. 8 is an assembled view of a fastener clip assembly, in accordance with some embodiments.

Figure 9:
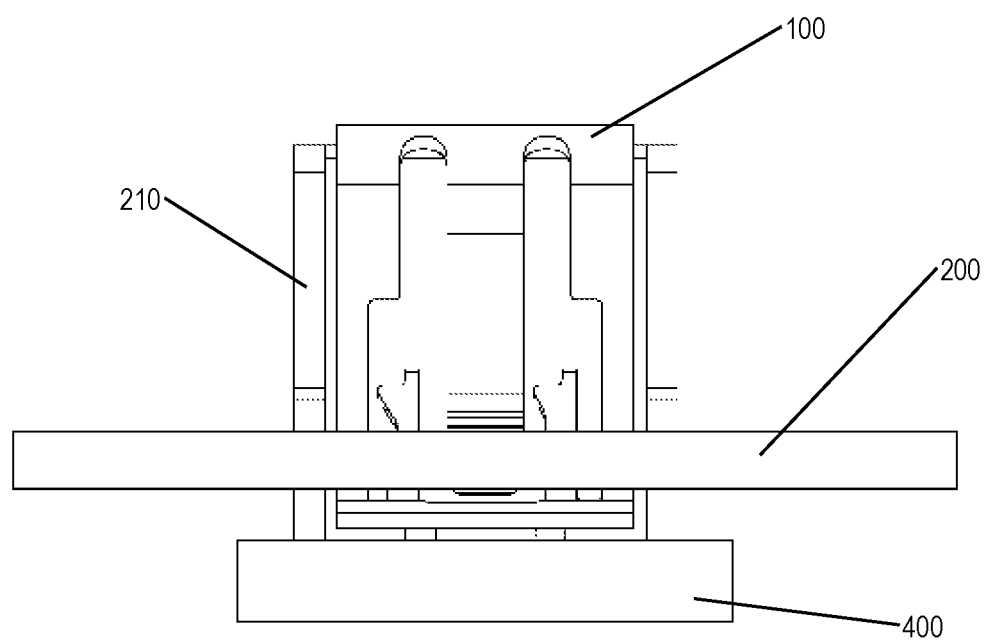
FIG. 9 is another assembled view of a fastener clip assembly, in accordance with some embodiments.

FIG. 9 is another assembled view of a fastener clip assembly, in accordance with some embodiments.

Fastener clip 100 is configured to join together two surfaces such as surfaces 300 and 400. Fastener clip 100 is configured to fit over and attach to blade 210 that is attached to surface 400, and in addition fastener clip 100 is configured to removably attach to the slot in surface 200. For example, the fastener clip system may be used to fasten together a body panel to the chassis of an automobile.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A fastener clip system comprising:
   a fastener clip,
      wherein the fastener clip is configured to attach over a blade on a panel, and
      wherein the fastener clip is configured to be removably coupled to a slot in a chassis,
   the fastener clip comprising:
      a top portion;
      a pair of legs and another pair of legs, wherein the pair of legs extends down from a side of the top portion, wherein the other pair of legs extends down from another side of the top portion;
      a foot and another foot, wherein the foot is attached to the pair of legs opposite the top portion, wherein the other foot is attached to the other pair of legs opposite the top portion;
      a wing and another wing, wherein the wing originates from the side of the top portion, wherein the other wing originates from the other side of the top portion, wherein the wing and the other wing are configured to facilitate the removable engagement of the fastener clip to the slot in the chassis;
      a pair of barbs extending up from the foot and another pair of barbs extending up from the other foot, wherein the pair of barbs and the other pair of barbs are configured to dig into and secure the fastener clip to the blade;
      a pair of stabilizing shoulder tabs originating from the side of the top portion and another pair of stabilizing shoulder tabs originating from the other side of the top portion, wherein the pair of shoulder tabs and the other pair of stabilizing shoulder tabs are configured to guide the fastener clip over the blade based at least upon the fastener clip being inserted over the blade.

2. The fastener clip system of claim 1, wherein the panel is configured to be coupled to the chassis based at least upon the fastener clip being configured to attach over the blade and the fastener clip being configured to be removably coupled to the slot.

3. The fastener clip system of claim 1, wherein the pair of stabilizing shoulder tabs and the other pair of stabilizing shoulder tabs are configured, based at least upon being bent by the blade being off a preferred relative position, to bend back restoring the blade to the preferred relative position.

4. The fastener clip system of claim 1, wherein the fastener clip is constructed from at least one of: spring steel, carbon spring steel, full hard stainless steel, hard plastic.

5. The fastener clip system of claim 1, wherein the pair of stabilizing shoulder tabs and the other pair of stabilizing shoulder tabs extend inwards with respect to the fastening clip and are configured to bend out in response to the fastening clip being inserted over the blade.

6. The fastener clip system of claim 1, wherein the pair of wings and the other pair of wings are configured to bend as the fastener clip is being inserted into the slot and to bend back over the slot securing the fastener clip to the chassis.

7. A fastener assembly comprising:
   a body panel comprising a blade coupled to the body panel;
   a chassis comprising a slot;
   a fastener clip,
      wherein the fastener clip is configured to attach over the blade, and
      wherein the fastener clip is configured to be removably coupled to the slot,
   the fastener clip comprising:

a top portion;

a pair of legs and another pair of legs, wherein the pair of legs extends down from a side of the top portion, wherein the other pair of legs extends down from another side of the top portion;

a foot and another foot, wherein the foot is attached to the pair of legs opposite the top portion, wherein the other foot is attached to the other pair of legs opposite the top portion;

a wing and another wing, wherein the wing originates from the side of the top portion, wherein the other wing originates from the other side of the top portion, wherein the wing and the other wing are configured to facilitate the removable engagement of the fastener clip to the slot in the chassis;

a pair of barbs extending up from the foot and another pair of barbs extending up from the other foot, wherein the pair of barbs and the other pair of barbs are configured to dig into and secure the fastener clip to the blade;

a pair of stabilizing shoulder tabs originating from the side of the top portion and another pair of stabilizing shoulder tabs originating from the other side of the top portion, wherein the pair of shoulder tabs and the other pair of stabilizing shoulder tabs are configured to guide the fastener clip over the blade based at least upon the fastener clip being inserted over the blade.

8. The fastener clip system of claim 7, wherein the panel is configured to be coupled to the chassis based at least upon the fastener clip being configured to attach over the blade and the fastener clip being configured to be removably coupled to the slot.

9. The fastener clip system of claim 7, wherein the pair of stabilizing shoulder tabs and the other pair of stabilizing shoulder tabs are configured, based at least upon being bent by the blade being off a preferred relative position, to bend back restoring the blade to the preferred relative position.

10. The fastener clip system of claim 7, wherein the fastener clip is constructed from at least one of: spring steel, carbon spring steel, full hard stainless steel, hard plastic.

11. The fastener clip system of claim 7, wherein the pair of stabilizing shoulder tabs and the other pair of stabilizing shoulder tabs extend inwards with respect to the fastening clip and are configured to bend out in response to the fastening clip being inserted over the blade.

12. The fastener clip system of claim 7, wherein the pair of wings and the other pair of wings are configured to bend as the fastener clip is being inserted into the slot and to bend back over the slot securing the fastener clip to the chassis.

* * * * *